C. W. SCHWARTZ, Jr.
CIRCULATING FAN FOR DRYING AND OTHER MACHINES.
APPLICATION FILED AUG. 17, 1909.
951,029.
Patented Mar. 1, 1910.
2 SHEETS—SHEET 2.
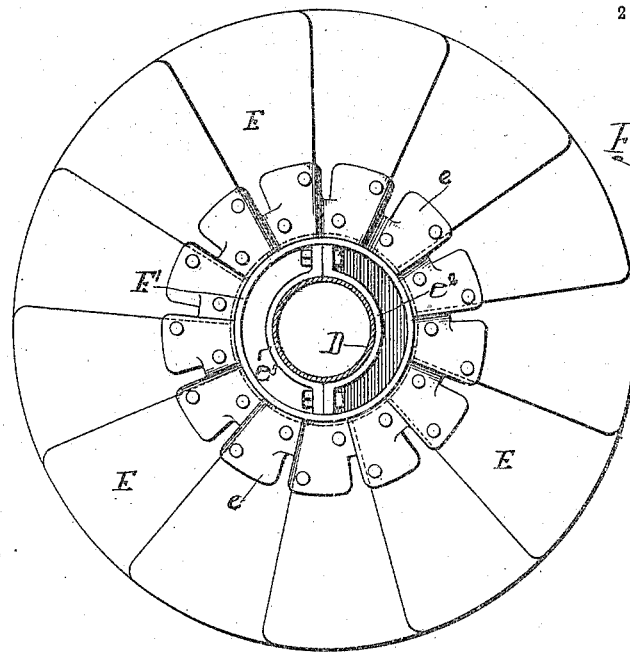
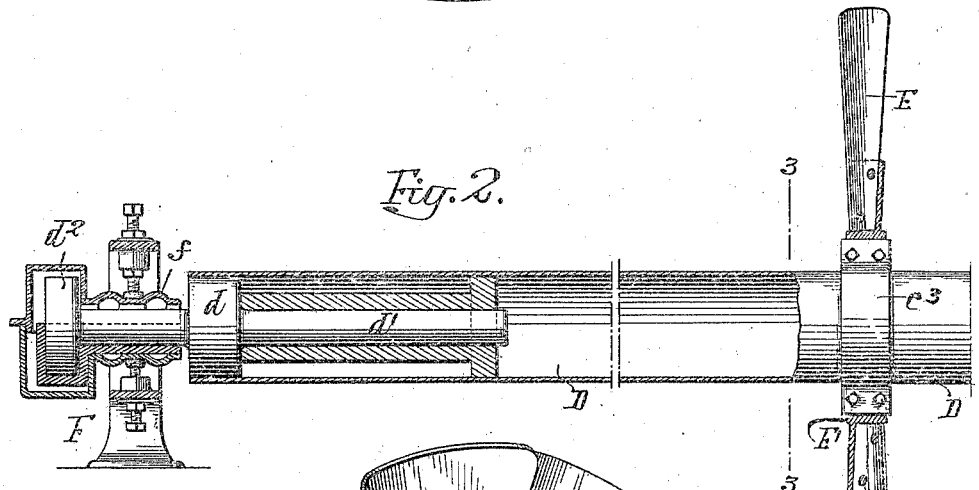
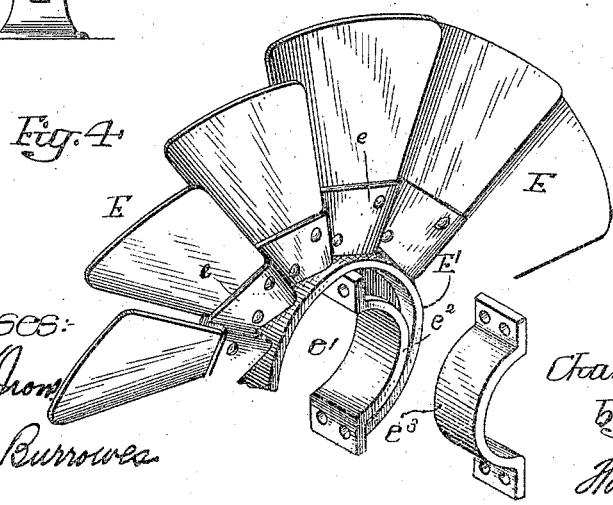
Witnesses:
Titus H. Irons
Willa H. Burrowes
Inventor—
Charles W. Schwartz, Jr.
by his Attorneys.

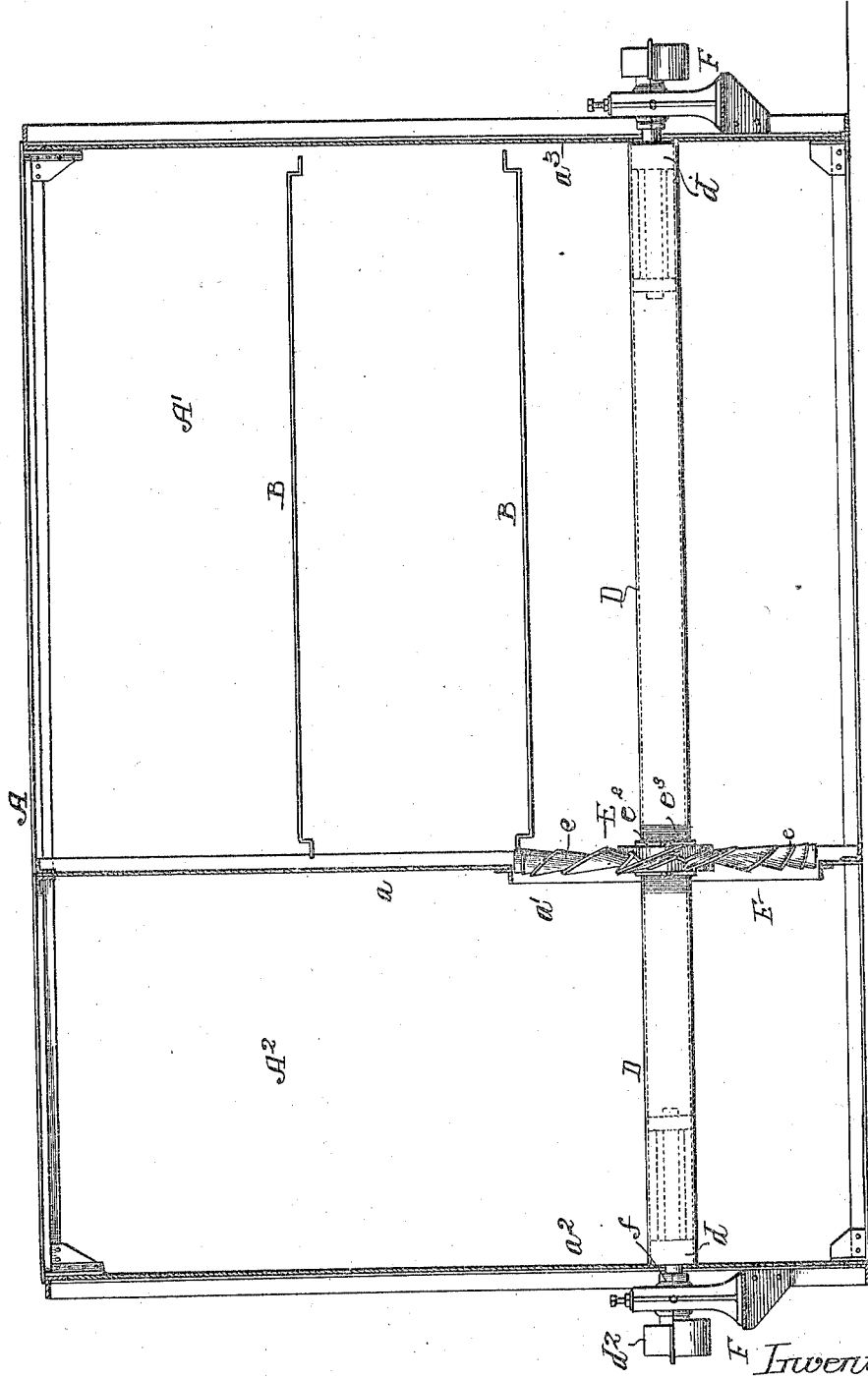

UNITED STATES PATENT OFFICE.

CHARLES W. SCHWARTZ, JR., OF PHILADELPHIA, PENNSYLVANIA, ASSIGNOR TO THE PHILADELPHIA TEXTILE MACHINERY COMPANY, OF PHILADELPHIA, PENNSYLVANIA, A CORPORATION OF PENNSYLVANIA.

CIRCULATING-FAN FOR DRYING AND OTHER MACHINES.

951,029.          Specification of Letters Patent.      Patented Mar. 1, 1910.

Application filed August 17, 1909. Serial No. 513,315.

*To all whom it may concern:*

Be it known that I, CHARLES W. SCHWARTZ, Jr., a citizen of the United States, residing in Philadelphia, Pennsylvania, have invented certain Improvements in Circulating-Fans for Drying and other Machines, of which the following is a specification.

The object of my invention is to so construct a fan for use in drying machines that no inside bearings are necessary. The bearings are on the outside of the casing of the drier and the fan is mounted on the trued portion of the tubular shaft, as fully described hereafter.

In the accompanying drawings:—Figure 1, is a transverse sectional view of a drier illustrating my invention; Fig. 2, is an enlarged view of a portion of the shaft showing the fan mounted thereon; Fig. 3, is a sectional view on the line 3—3, Fig. 2; and Fig. 4, is a detached perspective view of the fan.

A is the casing of the drier having a compartment A' in which is mounted the traveling belt B carrying the material to be dried.

$A^2$ is the heating compartment in which is mounted the steam coils or other heating apparatus of any suitable form. The two compartments are separated by a vertical partition $a$ in which is an opening $a'$.

D is the fan shaft and E is the fan mounted in the opening $a'$ in the partition $a$. The fan shaft in the present instance is tubular and extends from one wall $a^2$ to the other wall $a^3$ of the drier. The bearings F for the shaft are mounted on the outside of the casing of the drier and so arranged that access can be readily had to them.

The shaft D is made in the form of a tube and of sufficient diameter to prevent sagging of the shaft, due to its length, yet the shaft will be comparatively light so that it can be readily driven. Each end of the shaft is closed by a plug $d$, and mounted in this plug is the spindle $d'$ having at its outer end a collar $d^2$; and the bearing box $f$ is mounted between this collar and the side of the casing; the collar being inclosed within a casing carried by the bearing.

The fan E is made as illustrated in Figs. 3 and 4. The hub E' has a flange to which the blades $e$ are attached, as shown, and in this hub is an enlarged opening $e'$. On the hub is one half $e^2$ of a clamp, the other half $e^3$ of the clamp is detachable and secured to the first mentioned half by bolts or other suitable means. By this arrangement the fan can be slipped over the tubular shaft D and attached at any point throughout the length of the shaft by applying the clamp section $e^3$ and securing it to the hub; the shaft being gripped by the clamp and hub.

I find in practice that it is only necessary to true that portion of the shaft to which the fan is applied, so that an ordinary merchant tube can be used as the shaft. This entails very little expense and makes a very substantial, yet light construction for a circulating fan. The blades of the fan can be made in any form desired. When the fan is driven the circulation can be in either direction through the heating compartment $a^2$ down through the material carried by the endless band, or up through the material carried by the band and down through the heating compartment, as desired.

I claim:—

1. The combination in a drier, of a casing having a partition, a tubular shaft extending from one side of the casing to the other, a fan mounted on the tubular shaft in the opening in the partition, and bearings for said tubular shaft mounted on the outside of the casing.

2. The combination of a tubular fan shaft, bearings at each end supporting the shaft, a fan having a hub and blades, said hub having an enlarged opening through which the shaft can freely pass, and a detachable clamp for securing the hub of the fan to the shaft.

3. The combination of a tubular fan shaft having spindles at each end, bearings for the spindles, a fan having an enlarged opening in its hub through which the shaft is passed, and a clamp formed partly by the hub and partly by a detachable piece secured to the hub.

4. The combination in a drier casing, of a partition therein, an opening in the partition, two bearings mounted on the outside of the casing of the drier, a fan shaft extending from one side of the casing to the other and having spindles extending through the casing and mounted in said bearings, a fan secured to the shaft and mounted in the opening in the partition, the hub of said fan having an enlarged opening through which the shaft can be passed, and a clamp by which the fan is secured to the shaft, said clamp being partly formed by the hub and by a detachable section secured to the hub.

In testimony whereof, I have signed my name to this specification, in presence of two subscribing witnesses.

CHARLES W. SCHWARTZ, Jr.

Witnesses:
ULSTER ATKINSON,
WALTER M. SCHWARTZ.